(12) United States Patent
Bourne

(10) Patent No.: US 8,099,351 B2
(45) Date of Patent: Jan. 17, 2012

(54) METHODS, SYSTEMS, AND DEVICE READABLE MEDIA FOR PROPOSITION EVALUATION

(75) Inventor: Robert H. Bourne, New York, NY (US)

(73) Assignee: Wiktive LLC, Wilmington, DE (US)

( * ) Notice: Subject to any disclaimer, the term of this patent is extended or adjusted under 35 U.S.C. 154(b) by 431 days.

(21) Appl. No.: 12/369,469

(22) Filed: Feb. 11, 2009

(65) Prior Publication Data

US 2009/0313203 A1 Dec. 17, 2009

Related U.S. Application Data

(60) Provisional application No. 61/073,206, filed on Jun. 17, 2008.

(51) Int. Cl.
*G06Q 40/00* (2006.01)
(52) U.S. Cl. ............ 705/36 R; 705/36; 705/37; 705/38; 705/39
(58) Field of Classification Search ............... 705/15–45
See application file for complete search history.

(56) References Cited

U.S. PATENT DOCUMENTS

2007/0113094 A1* 5/2007 Moskowitz et al. .......... 713/176
2007/0180388 A1* 8/2007 Izhikevich .................... 715/751

OTHER PUBLICATIONS

"Ektron Recognizes All-Star Customers and Partners at Synergy 2007 Conference", Wireless News, Coventry: Sep. 20, 2007, p. 1.*
International Search Report for Application No. PCT/US09/33776, dated Mar. 26, 2009.
International Preliminary Report on Patentability for International Application No. PCT/US09/33776, dated Mar. 31, 2011.

* cited by examiner

*Primary Examiner* — Ella Colbert
*Assistant Examiner* — Hai Tran
(74) *Attorney, Agent, or Firm* — Morse, Barnes-Brown & Pendleton, P.C.; Sean D. Detweiler, Esq.

(57) ABSTRACT

A method, system, and device readable medium for running a predictive wiki optimization application is disclosed. The optimization application provides an improved decision-making or valuation method for formalizing and systematizing the decision-making or valuation process. The application leverages collective knowledge about a field of endeavor in order to yield better decisions or more accurate valuations. In some embodiments, the application represents an application of predictive markets within a wiki-style wrapper.

30 Claims, 13 Drawing Sheets

Capital Asset Pricing Algorithm ⸺ 1110

Abstract: An algorithm to improve upon the flaws in risk measurement produced by the Capital Asset Pricing Model (CAPM). The algorithm renders obsolete all documented attempts to rationalize CAPM's flaws against actual market behavior. By applying stochastic dominance analysis to historical daily close data on large baskets of stocks, the algorithm optimizes portfolio construction against a user-defined set of constraints — including risk profile, downside mitigation, tax consequences, hedge against concentrated positions, fees and turnover. ⸺ 1120

Inputs:
BOLT: 20
CORP: 13
MINE: 8
NEUT: 4
OPT: 17

Contribute new input

1140

Discussion Board ⸺ 1130

"The best bolt-on alpha is X"
"This software should have a corporate events manager within its logic"
"This isn't a financial product at all. It's better for pure data mining."
"Market neutral is the best strategy for this kind of protocol."
"This is a fast optimization only; it needs a bolt-on alpha strategy to work"

METHODS, SYSTEMS, AND DEVICE READABLE MEDIA FOR PROPOSITION EVALUATION

RELATED APPLICATIONS

This application claims priority to, and the benefit of, U.S. Provisional Patent Application No. 61/073,206, filed on Jun. 17, 2008, the contents of which are incorporated herein by reference.

FIELD OF THE INVENTION

The present invention relates to tools for use in the fields of information acquisition and analysis, decision-making, valuation, and the refinement and improvement of assets. The present invention may be applied in fields such as business investment, venture capitalism and intellectual property asset exploitation, as well as any field that leverages information in the decision-making process, such as investment management, corporate performance, counter-terrorism intelligence, market research or other areas.

BACKGROUND

In a variety of fields, limited access to high-quality information about a subject or proposition under analysis may be an obstacle to good decision-making. In some situations, little information is known about the subject or proposition to begin with. In other situations, a great deal of information may be available, but the relative value of each piece of information may be undetermined. A limited amount of high-quality information may be hidden among a large amount of low-quality information. Obtaining information, or determining the value of already-obtained information, may be a long, difficult, and expensive process. However, it is often necessary to undergo such a process in order to make well-informed decisions.

For example, a number of businesses follow a "hits" model, wherein a small percentage of successful investments generate returns substantial enough to compensate for a high percentage of relative (or absolute) failures. Venture capital ("VC") is an exemplary field that is traditionally viewed as a "hits" business. Timely access to high-quality information may allow businesses such as venture capital to increase their chances of selecting successful investments, thus increasing their success rates and return-on-investment.

One factor contributing to poor decision making, and thus a negative rate of return in fields such as venture capitalism, is a lack of a systematic method for rigorously evaluating a given subject, proposition, result, or option. One possible solution to improve the evaluation process is for decision-makers to acquire more information. However, experience has shown that access to more data may make a decision-maker more informed as to the realities of a business, but not necessarily smarter in interpreting those realities. With the precipitous growth of available information it becomes simply intractable to parse, analyze and make sense of all relevant data.

Typically, when more information is available than are experts to analyze it, organizations add more experts while continuing to mine available data as thoroughly as possible. But there are two problems with this tactic, especially for groups such as venture capitalists, who may participate at an early stage of development and may not have ready access to data about a market that doesn't yet exist.

The first problem with this tactic is the bias of experts. In a typical venture capital group, these experts may come from the ranks of successful investors and entrepreneurs. The downside to this expertise is that experience produces bias, and bias can be a hindrance to objective analysis of new markets and business scenarios. Methodologies or perspectives that have proven successful in the past may not work again.

The second problem with this tactic is the fact that expert predictions rely on subjective factors. For example, in a typical venture capital firm these factors may include prior performance of investments, interpretation of market conditions, 'au courant' investment fads, group politics, cultures of contrarian success and other skewing factors. These realities are often directive in decision-making. Consequently, the predictive utility of resultant decisions may be weakened.

FIG. 1 depicts a conventional VC decision-making process 100. The terminus for this process 100 is the prediction 130. Experts are given a number of initial inputs 110, which are combined and analyzed in a forecasting process 120. Exemplary considerations 200 that may be used as inputs in a VC decision-making model are shown in FIG. 2. Before investing in a firm, a venture capitalist may consider factors related to the market that the firm is involved with 210. Exemplary factors include the size of the market 212 and the degree of competitiveness of the market 218, whether the VC expects the market to grow or contract 214, and the rate of market adoption 216. A venture capitalist will likely also consider the factors related to the firm being considered for investment 220. Such factors may include the novelty or uniqueness of the firm's proposition 222, the protected IP that the firm has acquired 224, the skill and experience of the firm's management 226, the valuation of the firm, and the related costs to the VC of participating with the firm 228, and the firm's exit strategy from the market 230.

The forecasting process 120 may result in an initial prediction 130, which is then subjected to error analysis 140. At this point, the prediction may be subject to a requirements analysis 150 to determine whether the prediction meets requirements set down by the stakeholders. The process may continue to improve the initial prediction by subjecting it to further prediction refinement, error analysis, forecasting, and requirements analysis.

Thus, the final prediction 130 is reached through analysis and deliberation. Because this process involves a high degree of deliberative subjectivity, VC projections of an investment's success can be rife with error, even if error analysis is part of the equation.

Two problems may compound the difficulty of decision-making. First, collaborative groups tend to gravitate to the mean of their collective knowledge, without aggregating it. Second, such groups are easily politicized, resulting in risk aversion among their participants. The results can be a skewed perspective among the group, and predictive failure.

Similarly, an IP asset holder may go through a decision-making or valuation methodology when determining how best to value or exploit their IP. In order to exploit an intellectual asset optimally, the IP asset holder may utilize material input and participation from both early-stage finance sources and the marketplace.

Exemplary considerations 300 for an IP asset holder are detailed in FIG. 3. Each constituent in the IP value chain may utilize information from the other constituents in order to maximize value throughout the chain. The IP holder may therefore wish to determine information related to the application of the asset to the marketplace 310, including customer demand(s) 312, competitive initiatives 314, requirements for further development or refinement 316, pricing 318, ongoing R&D mandates 320 and asset life-cycle 322. The IP holder may also consider factors relevant to the IP under consideration 340, such as a realistic valuation of the IP in its nascent form 342, both at a pre-revenue stage and while the asset is viable as the basis for an enterprise, and the business prospects suggested by the IP asset 344. Other factors 350, such as pathways to early-stage finance 352, may come into play. For example, such pathways 352 may include equity, debt, or another mix of instruments.

To obtain such information, an IP holder may pursue a program of research involving market studies, focus groups of potential adopters, analysis of comparative enterprises (where visible) and their models, consultative advisory and more. The goal of this process is to derive a cogent business proposition for the asset. Then, once such a proposition is constructed, the IP holder will approach early-stage finance or licensing candidates to pursue the proposition. If possible, this work may be conducted in conjunction with subject experts, both in the discipline of the IP and in all areas of pertinent business logic.

Although this procedure may prove useful in the decision-making process, it is often abrogated in the real world for a number of reasons. For instance, market studies, surveys, focus groups and soft launches, where professionally designed and implemented, are expensive and time-consuming. Further, market research may not provide optimal aggregation of the market's perspective on an asset. Rather, it acts like a poll, providing feedback on aspects of the proposition (product makeup, pricing, consumer targeting, etc.), and serves as a subjective (and potentially helpful) snapshot of the market's potential bearing. However, market research does not necessarily provide a comprehensive picture of the viability or success calculus of the initiative. As such, research can make stakeholders feel better and more informed about the IP's prospects, but the risks associated with the IP may not be materially improved by this procedure.

IP originators such as research universities, national laboratories, corporate entities, and early-stage investors can suffer from an inefficient and suboptimal methodology for analyzing, evaluating, valuing and exploiting intellectual property or new product concepts. These parties in the IP value chain, and the marketplace they ultimately seek to address, may lose out on material opportunity and profit as a result.

Taken together, these problems of economics and utility may make the pre-launch research process (upon which early-stage financiers can rely heavily) problematic. These problems may be compounded in the case of institutions with a variety of potential assets, each of which might require pre-launch research. The result may be a materially unexploited IP asset or product, leaving substantial economic benefits unrealized.

Further, decision making is becoming increasingly complicated. For example, markets continue to evolve with increasing speed and complexity, and as opportunities for investment arise in more esoteric forms (and with higher levels of competition for participation), there is a need for an improved decision-making process for selecting investments.

There is a need for a systematic approach to decision-making and valuation so that decision-makers may obtain a clear view into the real prospects, value and market applications of the objects of their decision-making (such as IP). The present invention relates to a predictive wiki optimization application that meets this need by systematizing and formalizing the valuation and decision making process.

SUMMARY

The present invention relates to a method, system, and medium holding instructions for evaluating a proposition under analysis. The proposition under analysis may be an asset, idea, question, or any subject which may be evaluated or analyzed on the basis of available information. In order to analyze the proposition, participants are identified that will take part in the evaluation process. The participants may be experts in a field related to the proposition, or non-experts, or a mix of both. A series of inputs are established, either by the participants or one or more outside observers. "Bidding" then takes place on the inputs, and utility values are assigned to the inputs based on the bidding. Refinements to the utility values may take place as bidding continues. As the process is carried out, further inputs may be solicited and added to the bidding pool. Participants may then be allowed to bid on the further inputs. After bidding has finished, a consensus regarding the proposition under analysis is determined based on the determined utility of each of the inputs.

The inputs may be collected over the Internet through an appropriate interface, and bidding may be carried out through a predictive market, wherein the inputs are represented as stocks that the participants trade.

The proposition under analysis may be an intellectual property asset, in which case the consensus may relate to the valuation of the asset.

For example, in one embodiment, the proposition under analysis is a patent. A patent holder may provide an abstract of the patent, the claims of the patent, or the entire patent for public review. The patent holder may invite experts in the field of the patent, economists, lay consumers, academics, and others to act as participants. The participants may set forth a number of propositions or inputs, using a wiki-style mechanism. Within the wiki, an entry may correspond to each input. The inputs may be related to, for example, optimizations of the patent, improvements on the patent, applications of the patent, limitations of the patent, or other considerations. The participants are then invited to participate in an evaluation of the inputs, for example through a predictive market. Participants may be given a certain amount of starting capital, and may "spend" their capital on different inputs that they consider to be the most correct, insightful, or otherwise "valuable," establishing a price or value for the input. As the predictive market takes effect and progresses, the most "valuable" inputs increase in price. More inputs may be added, or inputs may be refined, as time goes on. At a designated stopping point, which may be after a certain amount of time passes, after all the capital has been spent, after the prices have an opportunity to stabilize, or at any other appropriate time, the "prices" of the inputs are compared. The inputs with the highest price may be determined to be the most "valuable." For example, if the most valuable inputs relate to the limitations or weaknesses of the patent, or an alleged commercial non-viability, the patent holder may decide that commercializing the patent is not worthwhile. Alternatively, if optimizations or applications are proposed for the patent, the patent holder might decide to commercialize the patent. In addition, the patent has been vetted by the public, and the patent holder may have an idea of the value of the patent.

The above-described process may serve several purposes. If the patent holder wishes to commercialize the patent, the process allows the patent holder to gauge applications of the patent, interest in the underlying technology, and the economic feasibility of commercialization. The above process could also be used to value the patent in anticipation of a sale or license of the patent. If the patent holder wishes to refine the ideas presented in the patent, the above process can be used to determine optimizations, applications, and limitations of the patented technology.

DESCRIPTION OF THE DRAWINGS

The invention may be better understood by reference to the following Figures. The Figures are intended to be illustrative only, and one having ordinary skill in the art will recognize that other implementations of the present invention are possible.

FIG. 11. depicts an exemplary screenshot of a proposition under analysis and several inputs for use in a predictive market;

DETAILED DESCRIPTION

The present invention is related to a software application, a method performed in an electronic device (such as a computer), a system for performing the method, and a computer readable storage medium storing instructions for the method. The present invention provides an improved decision-making or valuation method for formalizing and systematizing the decision-making or valuation process. This may be accomplished, in one embodiment, using a predictive wiki optimization application. The application leverages collective knowledge about a field of endeavor in order to yield better decisions or more accurate valuations, optimize asset valuation, and maximize the probability of market success. In some embodiments, the application represents an application of predictive markets within a wiki-style wrapper.

The present invention recognizes wikis and predictive markets. Wikis are useful for collecting and vetting information from a wide constituency, often producing a comprehensive view of collective knowledge on a specified topic quickly. Predictive markets leverage the knowledge of a stakeholder group to qualify and assign probabilistic value to a set of propositions.

Whereas both methodologies (wikis and predictive markets) individually serve to aggregate knowledge effectively, the combination of these platforms may act as a force multiplier—rendering unexpected results derived from synergies provided by the combination of the two methodologies into a single implementation.

Although specific examples will be described using predictive markets and wikis, the present invention is not so limited. Other implementations are also possible without diverting from the scope of the present disclosure. For example, knowledge aggregation and acquisition may be accomplished through a wiki on the Internet, or a blog or electronic bulletin board, or a suitable "offline" methodology may be used. In place of a predictive market, a polling system or other democratic means may be used.

As used herein, the term "stakeholder" means a person or entity that has an interest in the outcome of a decision. Examples of stakeholders include asset holders, researchers, potential customers, business managers and investors.

As used herein, the term "participant" means a person or entity that participates in one or more aspects of the decision-making process. A participant may participate, for example, by entering information into a wiki, evaluating information in the wiki, and buying or selling "stocks" in a predictive market. In one exemplary embodiment, as will be discussed in more detail below, each of the "stocks" represents a different idea regarding how to exploit an asset. A participant may be, for example, an expert in a field related to the decision, an expert in a related field, a non-expert, a consumer, an academic, a stakeholder, or a randomly selected member of a population.

Figure 1:
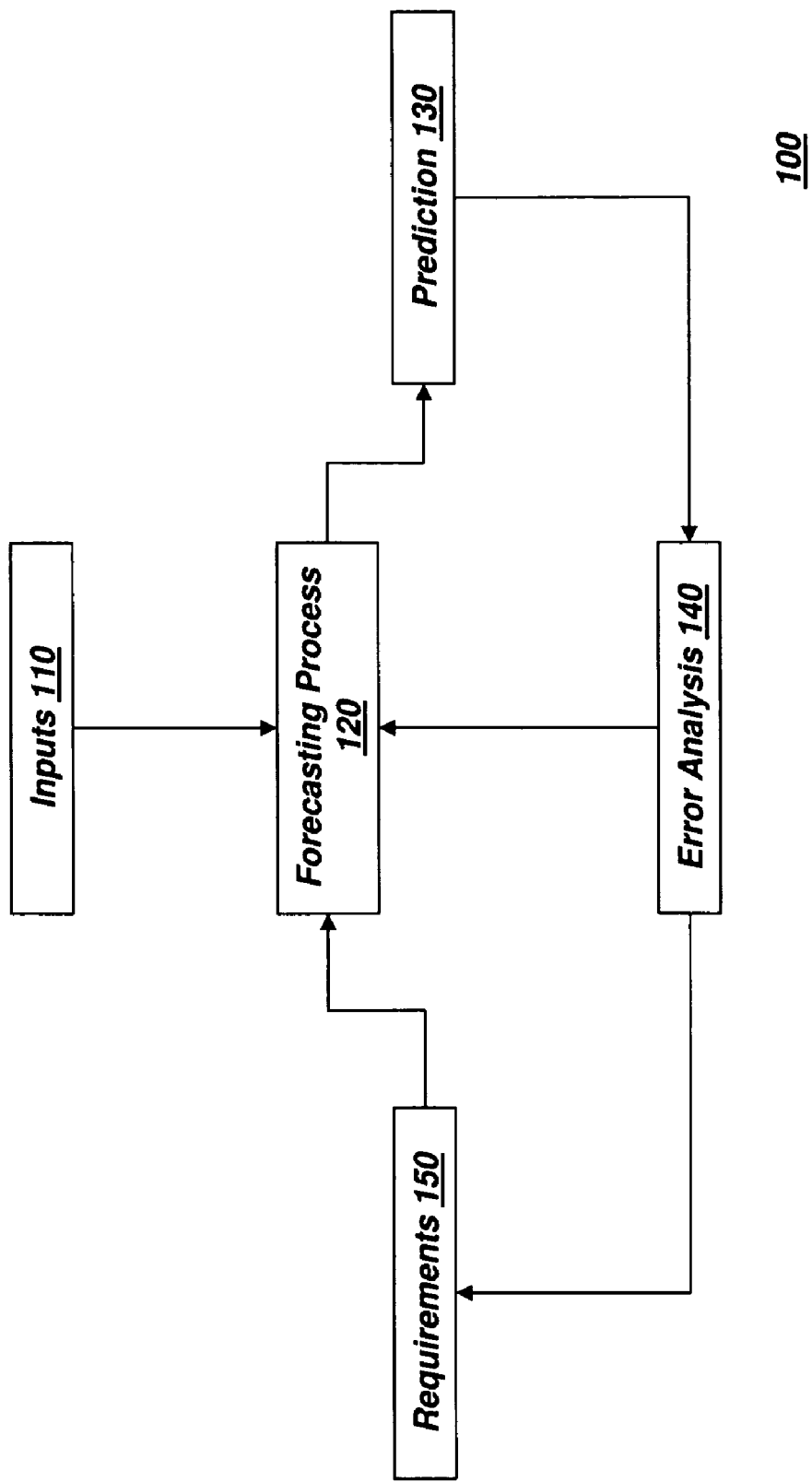
FIG. 1. depicts a decision-making process.
Figure 2:
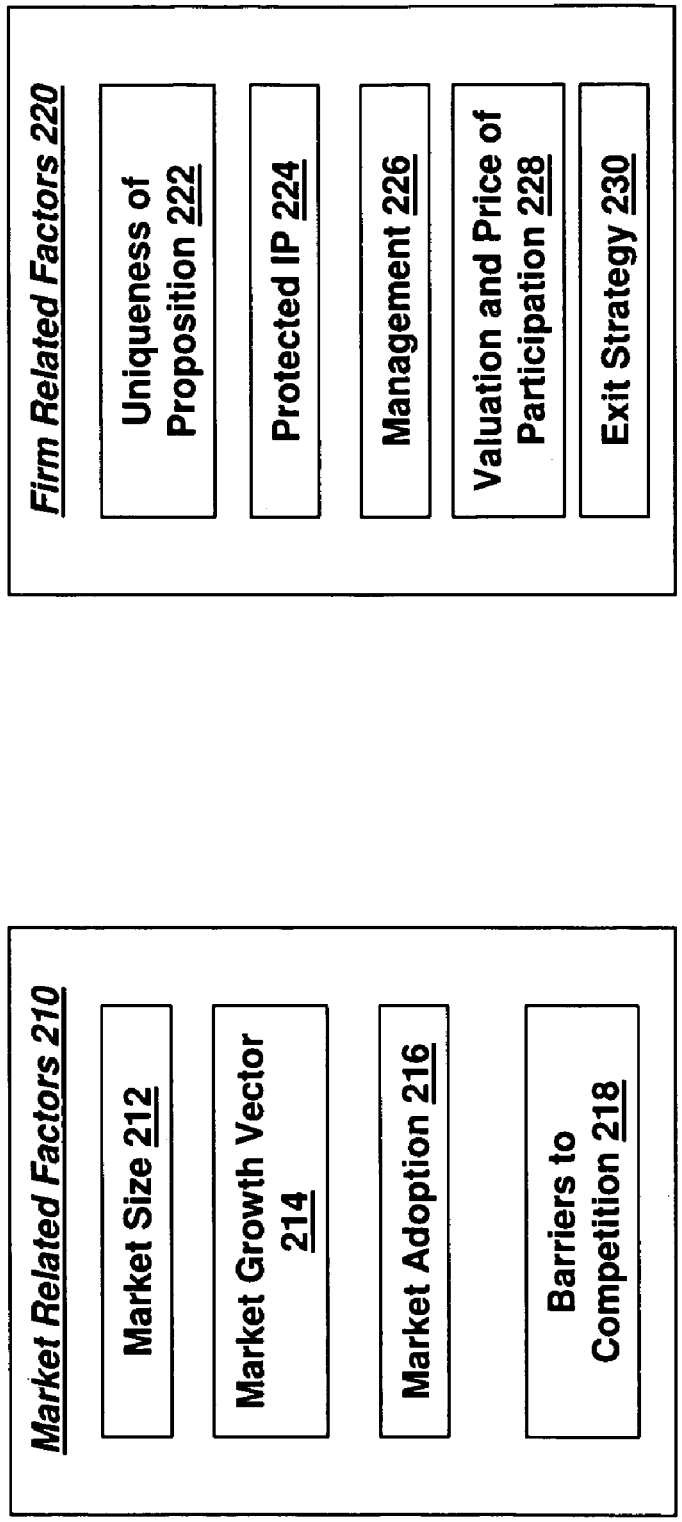
FIG. 2. depicts exemplary considerations that may be used in the decision-making process of FIG. 1 in the case of a decision regarding venture capital investment.
Figure 3:
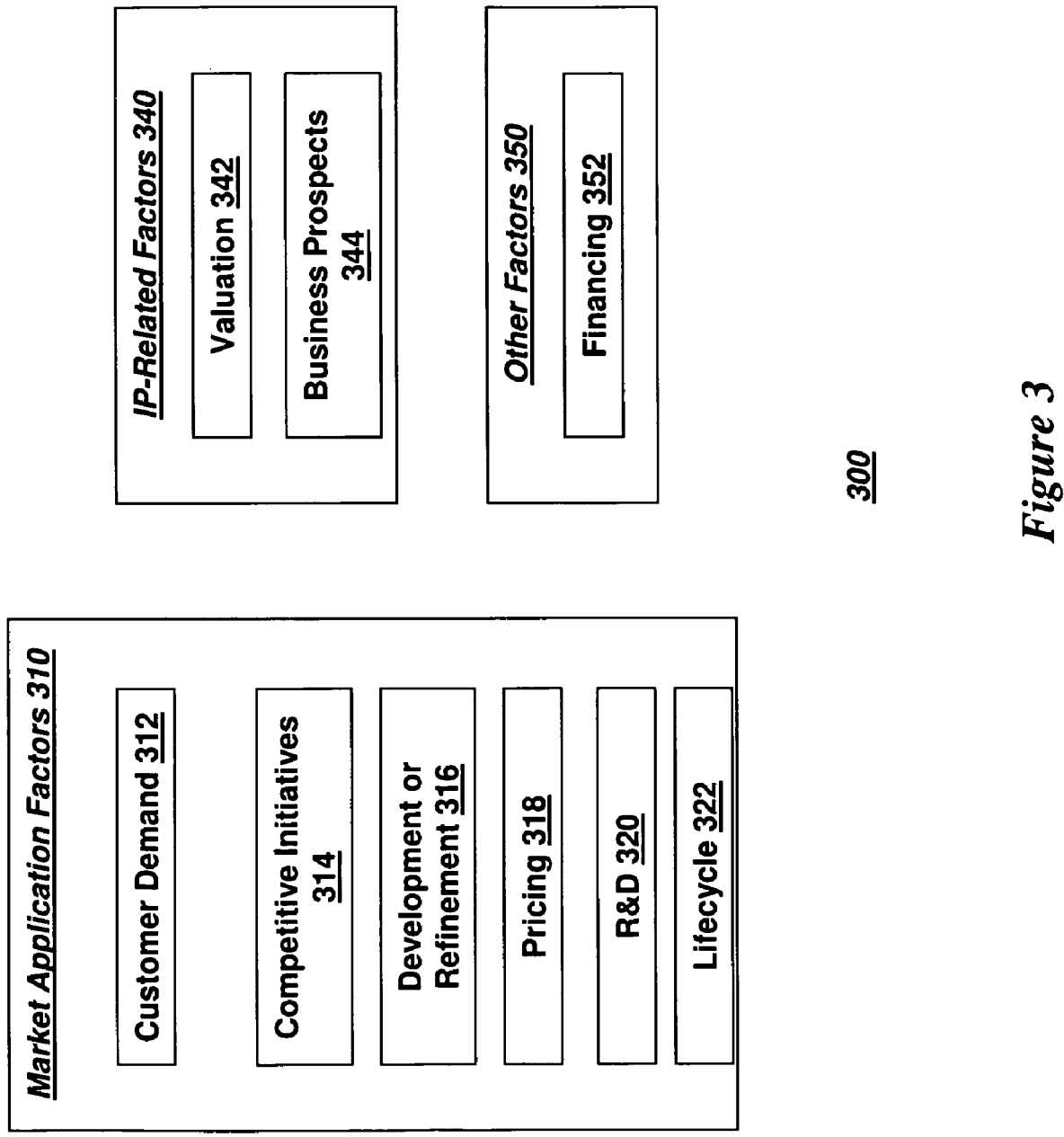
FIG. 3. depicts exemplary considerations that may be used in the decision-making process of FIG. 1 in the case of a decision regarding intellectual property asset valuation.
Figure 4:
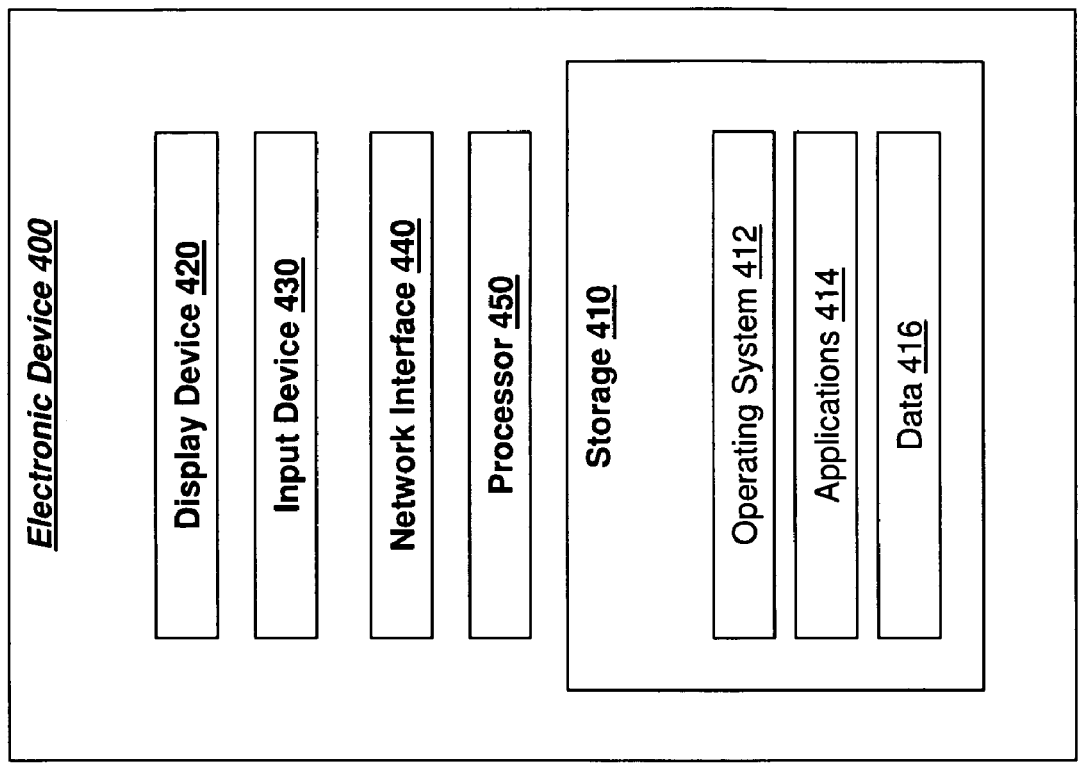
FIG. 4. depicts an electronic device suitable for practicing the invention described herein.

As depicted in FIG. 4, the present invention may be implemented in an electronic device 400. The electronic device 400 may take many forms, including but not limited to a workstation, server, network computer, Internet appliance, mobile device, a pager, a tablet computer, a cell phone, a personal digital assistant (PDA), and the like. One of ordinary skill in the art will appreciate that the electronic device 400 is intended to be illustrative and not limiting of the present invention.

The electronic device 400 may include a processor 450, such as a Central Processing Unit (CPU), storage 410, an input control 430, a network interface 440, a display 420, etc. The input control 430 may interface with a keyboard, a mouse, and other input devices. The electronic device 400 may receive through the input control 430 input data necessary for practicing the described methodologies. The network interface 440 enables the electronic device 400 to communicate with other electronic devices through communication networks, such as Internet, intranet, LAN (Local Area Network), WAN (Wide Area Network) and MAN (Metropolitan Area Network). The communication facilities may support for the distributed implementations of the present invention.

The processor 450 may control each component of the electronic device 400. The storage or memory 410 may provide to the processor 450 instructions or code that needs to be accessed by the processor to operate the electronic device and to run the software described in the present disclosure. The processor may execute the instructions or code. The memory usually contains software tools for applications 414. The storage 410 includes, in particular, code for the operating system (OS) 412 of the device 400, code for applications 414 running on the operation system, and data 416 used or generated in the device. Examples of storage 410 include, but are not limited to, RAM, ROM, CDs, DVD, tape drives, zip drives, flash memory, and hard drives. The media that make up storage 410 may also be referred to as "computer readable media" or "electronic device readable media."

The storage 410 generally initializes and loads the device memory with an operating system (OS) 412 at a boot process. The operating system 412 performs the allocation and usage of hardware resources, such as the memory 410, CPU time, and storage space. Those skilled in the art will appreciate that the memory 410 may also contain additional items that are not explicitly described.

Figure 5:
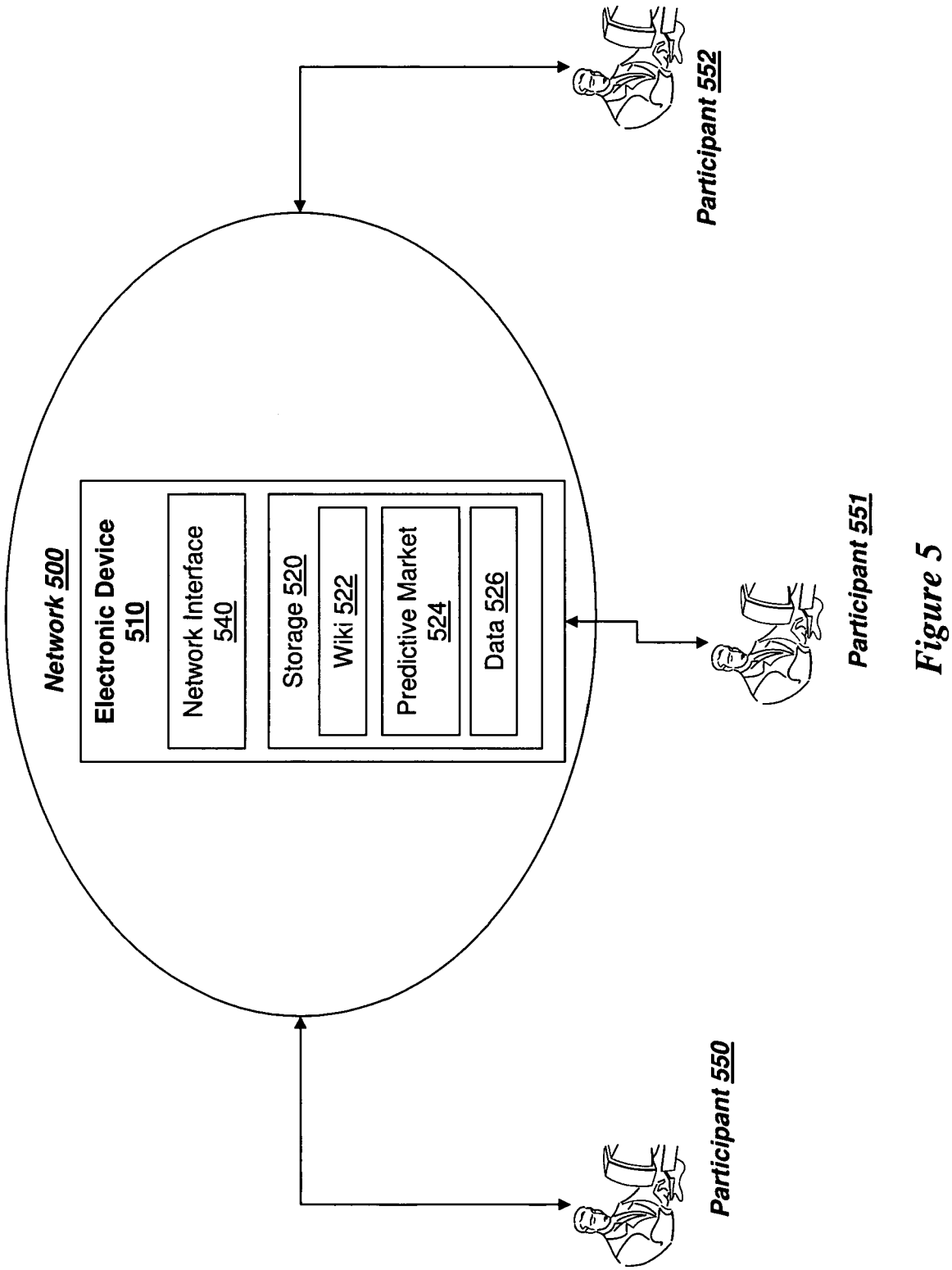
FIG. 5. depicts a network suitable for use with the embodiments described herein.

As shown in FIG. 5, the present invention may be implemented in a network environment 500. An electronic device 510, such as a server or personal computer, may be connected to participants 550, 551, 552 through the use of a network interface 510. Storage 520 may store code or instructions for operating the electronic device 510, as well as providing functionality for the methods described herein. For example, the storage 520 may provide instructions for establishing and maintaining a wiki 522 and predictive market 524, and storage for data 526 used or generated in the wiki 522 and predictive market 524.

The present invention may make use of a predictive market 524. A predictive market is a speculative market used to make predictions. Predictive markets can be employed to provide decision foundation, set benchmarks and performance goals, and aggregate the knowledge of stakeholders in a proposition. Predictive markets, also termed "intellectual futures" or "idea markets," provide access to information that is collectively known about a proposition. Predictive markets allow stakeholders to manage knowledge, collect data, and support decision making.

In a predictive market, a question or proposition may be posed, and a set of potential answers is generated covering the known range of likely outcomes to the question. Each answer is assigned a trading instrument, and a market is set up to determine the relative value of each instrument. Participants are selected and given a uniform quantity of "capital," which may be real or proxy, to invest in the market, and proceed to trade in the value of each outcome range. After a prescribed trading period has ended, the relative contract value of each answer range is identified. The most valuable issue, or subset of issues, is deemed to be the community's best prediction of the proposition's outcome.

Each participant may be accorded equal buying power, anonymity, and the opportunity to pit his or her expertise against that of the group. The market self-regulates to each participant's behavior and trading activity, and generates a set of predictive measures against the proposition. Participants are incentivized, and their knowledge is aggregated to form a communal prediction of a specific outcome.

Figure 6:
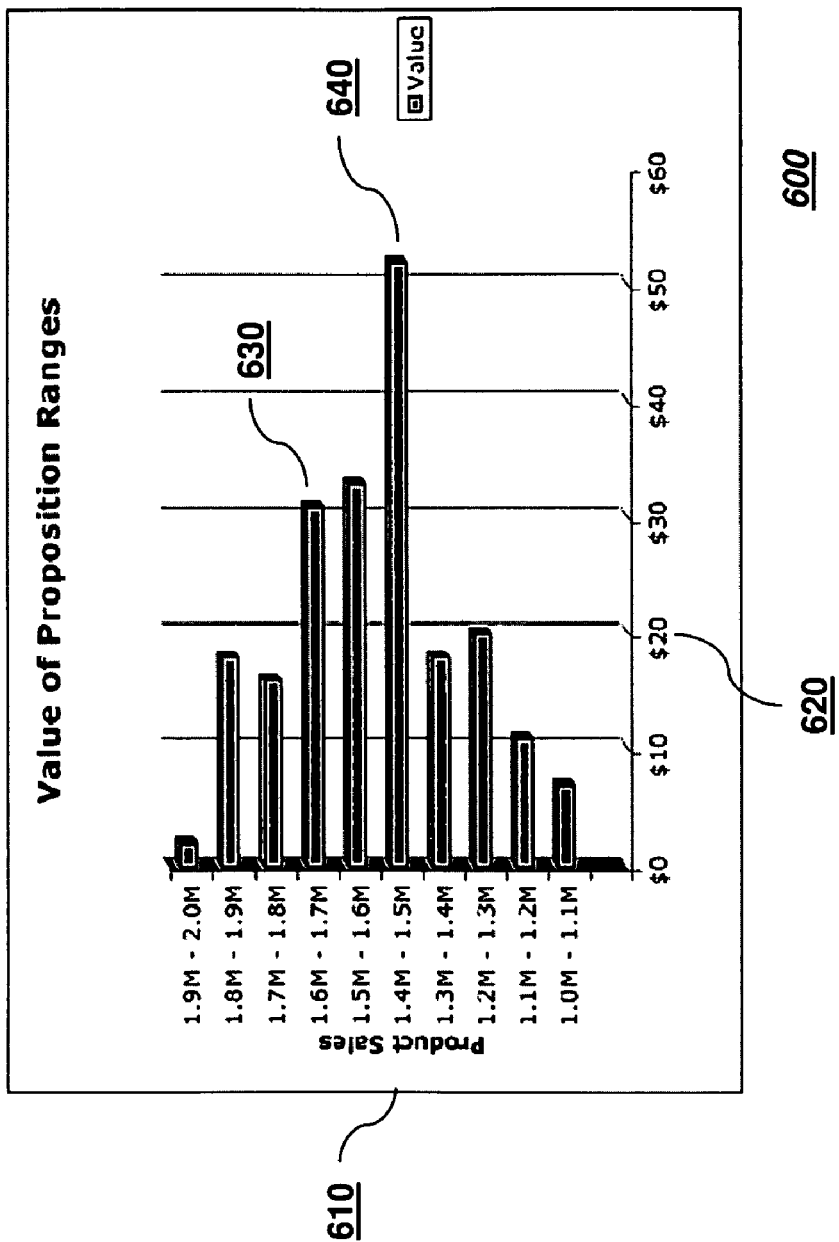
FIG. 6. depicts an example of a consensus in a predictive market.

An example of the results obtained using a predictive market is shown in FIG. 6. A question is posed, such as, "how many units of a product will sell to the market in 2007?" Assuming that the correct answer must fall within a certain range, such as 1,000,000 to 2,000,000, a series of ten ranges 610 is derived between those goal posts, and each range is assigned a market issue. Participants are told that, if they choose the correct range 610, they will receive a payout of $100. If they are incorrect, they receive $0. The amount 620 each participant is willing to invest in each range 610 given the potential payoff is represented along the x-axis of graph 600. Graph 600 represents the market results.

In this scenario, the market has determined that one range 640 is the most likely outcome of sales performance. Other outcomes around this range, such as outcome 630 are deemed tenable, but none is viewed as worthy of investing the majority of the participant community's aggregate capital. When viewed in terms of probability, the market has suggested that the range 630 has a 30% likelihood of occurring, and the range 640 carries a 51% likelihood. Statistically, while a 51% likelihood may not appear to be a strong mandate for that projection, it represents the market's prediction of likely unit sales.

In the above-described example, the ranges 610 (i.e., the "stocks" in the predictive market) were established prior to the commencement participant involvement. This is possible because it was assumed that the correct answer had to fall somewhere within the series of ten ranges 610. While such a system is useful for gauging the participants' view of the market given certain assumptions, it is less useful when stakeholders desire new information, which might be the case if the upper and lower limits of the ranges 610 were initially unknown. As will be described in more detail below, the present invention can leverage participants' collective knowledge through an interactive application, such as a wiki. The wiki's entries may be logged as "stocks" in the predictive market before, during, or after participant involvement is initiated. Thus, the stocks could be logged prior to participant involvement, as in the above example, or participants could start with an empty pool of "stocks," and may be allowed to fill the pool with stocks logged from the wiki and trade the stocks at the same time. Further, entries do not need to be logged as stocks in the predictive market at only one time. For example, an initial set of stocks could be established before trading commences, and new stocks can be added as trading occurs.

There are several possible structures for a predictive market, including but not limited to winner-take-all, index, and spread, as well as more complex cascading-logic and contingent designs. Exemplary embodiments are described using the winner-take-all model, "paying" the contract holder a set reward if the contract's answer range is proved to be true, and nothing if it is false. This method yields a set of relative probabilities that various answer ranges will prove true. However, the present invention may make use of any of the possible predictive market structures.

A financial market is a useful setting for the aggregation of knowledge from sources across varying levels of expertise. In this environment, disparate data are collected and analyzed, and resultant value judgments are expressed as stock price. This agreed value regulates itself dynamically according to the group's ongoing appraisal of the enterprise's overall utility within its stated model. The result is an indicator of an enterprise's current and future value.

In a predictive market, traders' identities may be hidden from other traders. The protection of anonymity may improve a market's success in predicting value, as each stakeholder may invest and participate without reservations caused by career concerns, adherence to corporate dictum or other skewing factors. Financial markets offer an incentive for accuracy, the promise of profit for getting it right.

The present invention may also leverage a wiki-style information market input platform. Wikis aggregate information inputs and utilize a distributed group of users to control the accuracy of the input information. Wikis may provide users with the ability to provide their knowledge on a variety of subjects, each subject presented as an entry in the wiki. Users may add new entries, add new information to existing entries, or modify the information relating to an entry. Some wikis utilize a dedicated group of editors, while other wikis allow the body of users to self-regulate the content of the wiki. Wikipedia is one well-known example of the wiki format.

Although the invention will be described with reference to a wiki, one having ordinary skill in the art will recognize that other implementations are possible without diverting from the scope of the present disclosure. For example, the invention could be implanted utilizing a web log ("blog"), or other type of interactive implementation.

In one embodiment, the present invention presents a web-based wiki environment, wherein each discrete "topic" in the wiki is defined as an input. The participants that make up the user base contribute ideas for evaluating or improving the subject matter of the input. For example, in the context of an IP asset, participants might contribute information related to market application, technical enhancement, pricing, and product profile. These are issues underlying real-world exploitation of the IP. But instead of gathering these valuable inputs in a free-form way (as in the case of a standard wiki), the software application logs each material contribution as a discrete "stock", which is then traded by a participant community as it further enriches and refines the IP proposition.

As each refinement or commercial application is added as a stock to the market, the market applies a predictive engine to it through the mechanism of the trading applied to the stock representing the refinement or application, as well as the trading applied to other stocks in the market. In this way, the market evaluates the importance of the refinement or application and determines its probability of success. Each piece of content is thus modeled predictively to determine its likely merit in the marketplace.

By the end of trading, the software application (and its market participants) have created an illustration of the market's appetite for the IP, precisely what application(s) of that IP are most tractable in the real marketplace, detailed refinements of those applications, and the market's prediction of which IP configurations fit which business opportunities, and the probability that these opportunities will or will not succeed.

Figure 7:
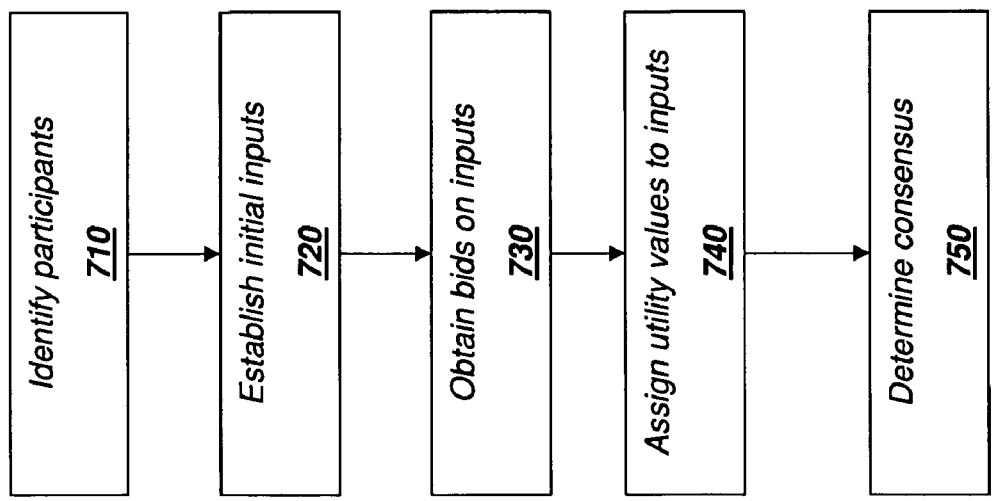
FIG. 7. depicts a flowchart of an exemplary method used in embodiments of the present invention.

One procedure for practicing exemplary embodiments of the invention is shown in the flowchart FIG. 7. At step 710, the participants who will evaluate a proposition or assist in decision-making are identified. The participants may be known to each other, or they may be anonymous. The proposition may be in a particular field of study (e.g., computer processors, economics, car sales, etc.), and the participants may include experts in the field. Alternatively, experts in the field may be excluded in favor of non-experts, or a mix of experts and non-experts may be used. Initial inputs are accepted at step 720. The inputs may be propositions, comments, suggestions, criticisms, or evaluations of, or answers to, the proposition under consideration. These inputs may be generated by the participants, or the inputs may be provided by stakeholders or outside parties. The inputs may be logged in a wiki, or another information aggregation system may be used.

At step 730, bids are obtained on the inputs through an evaluation system. In the case where the evaluation system is a predictive market, these bids may be in the form of capital invested by the participants, which may be drawn from a pool of provided capital. Capital may be anything having real or artificial value. Examples of capital include actual currency, electronic currency, artificial currency created specifically for the example market, or a combination of currencies, gift certificates, commodities, etc. Performance incentives may be provided to improve participant's incentives to invest wisely among the available inputs. Instead of a fixed pool of capital, "bidding" may be achieved through a simple affirmative or negative vote. For example, a participant could vote "I agree with this input" or "I do not agree with this input." In some embodiments, a cost may be associated with such bidding.

At step 740, utility values are assigned to the inputs based on the bidding done in step 730. In the case of a predictive market, the market may self-regulate and assign utility values automatically. The utility values may be based on an analysis of supply and demand for the input in question. Alternatively, utility values may reflect a poll of the "voting" described in step 730.

Based on the utility values, a consensus related to the proposition under consideration may be generated at step 750. A consensus may be an evaluation of the proposition, or of the inputs related to the proposition. If, for example, the proposition under evaluation is a question (e.g., "how many units of product X will be sold next year?"), then the consensus may reflect the market's answer to that question. In another example where the proposition under consideration is an abstract of an IP asset, then the inputs may reflect judgments of, or refinements of, the IP asset, and the consensus may reflect the market's evaluation of the inputs.

Figure 8:
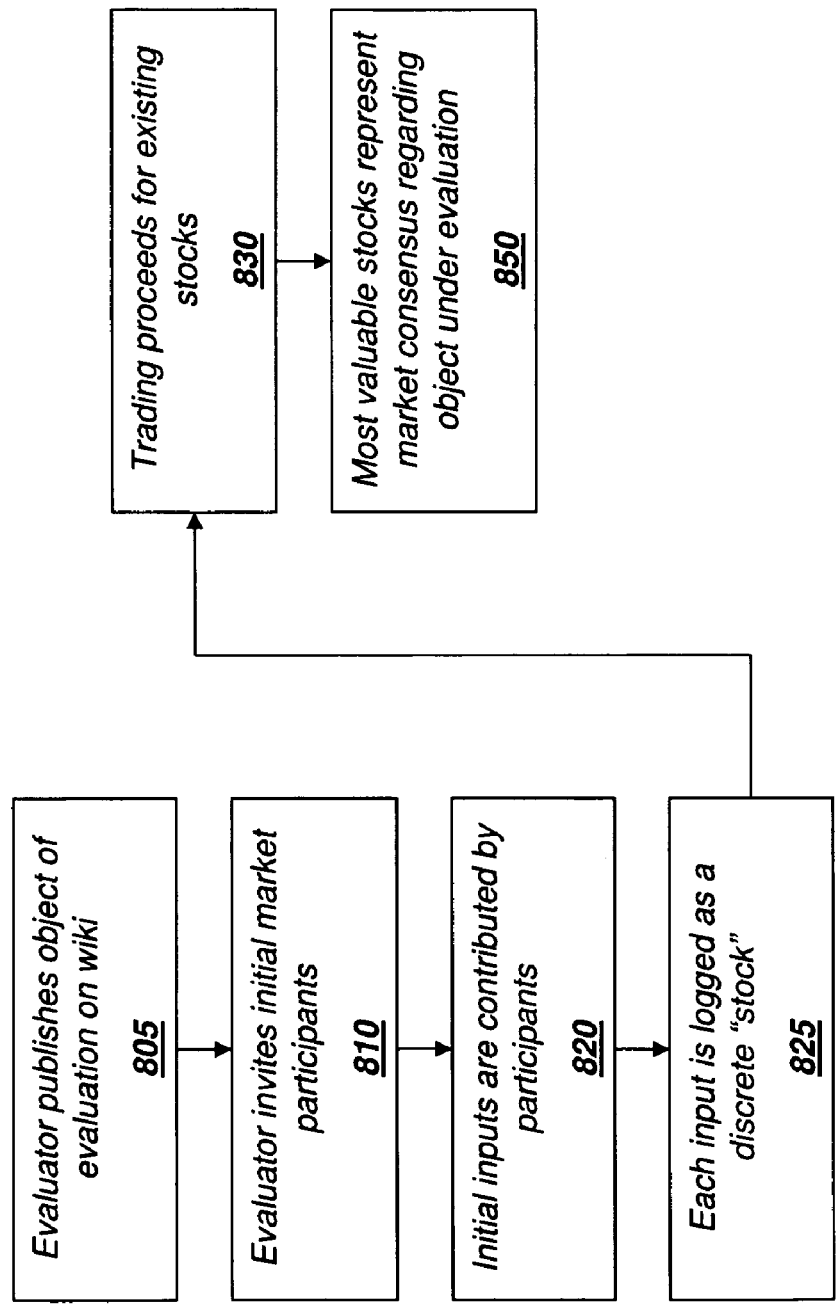
FIG. 8. depicts a flowchart of an exemplary method used in embodiments of the present invention incorporating a wiki and a predictive market.

An example is shown in FIG. 8 where the information aggregation system is a wiki and the evaluation system is a predictive market. At step 805, a stakeholder publishes the proposition or object of evaluation on the wiki. The proposition or object of evaluation may be published in an entry on the wiki as an abstract. The stakeholder may invite initial participants at step 810, and at step 820, the participants contribute initial inputs on the wiki. Each input may be logged as a separate topic on the wiki. At step 825, each of the inputs in the wiki is logged as a separate "stock" in the predictive market. At step 830, trading on the stocks in the predictive market commences, and may proceed for as long as the stakeholder elects. A set end-date for trading may be selected before trading commences, or an end-date may be selected based on an evaluation of the state of the market. Alternatively, the participants may be allowed to decide when trading will be finalized, or trading may proceed indefinitely. If trading is stopped at a certain end-date, then the stakeholder may mark the value or utility of each input at the end date; if trading proceeds indefinitely, then such an evaluation may take place at any given time during trading. The most valuable "stocks" are interpreted, at step 850, as representing the market consensus regarding the inputs and the proposition or object of evaluation.

Figure 9:
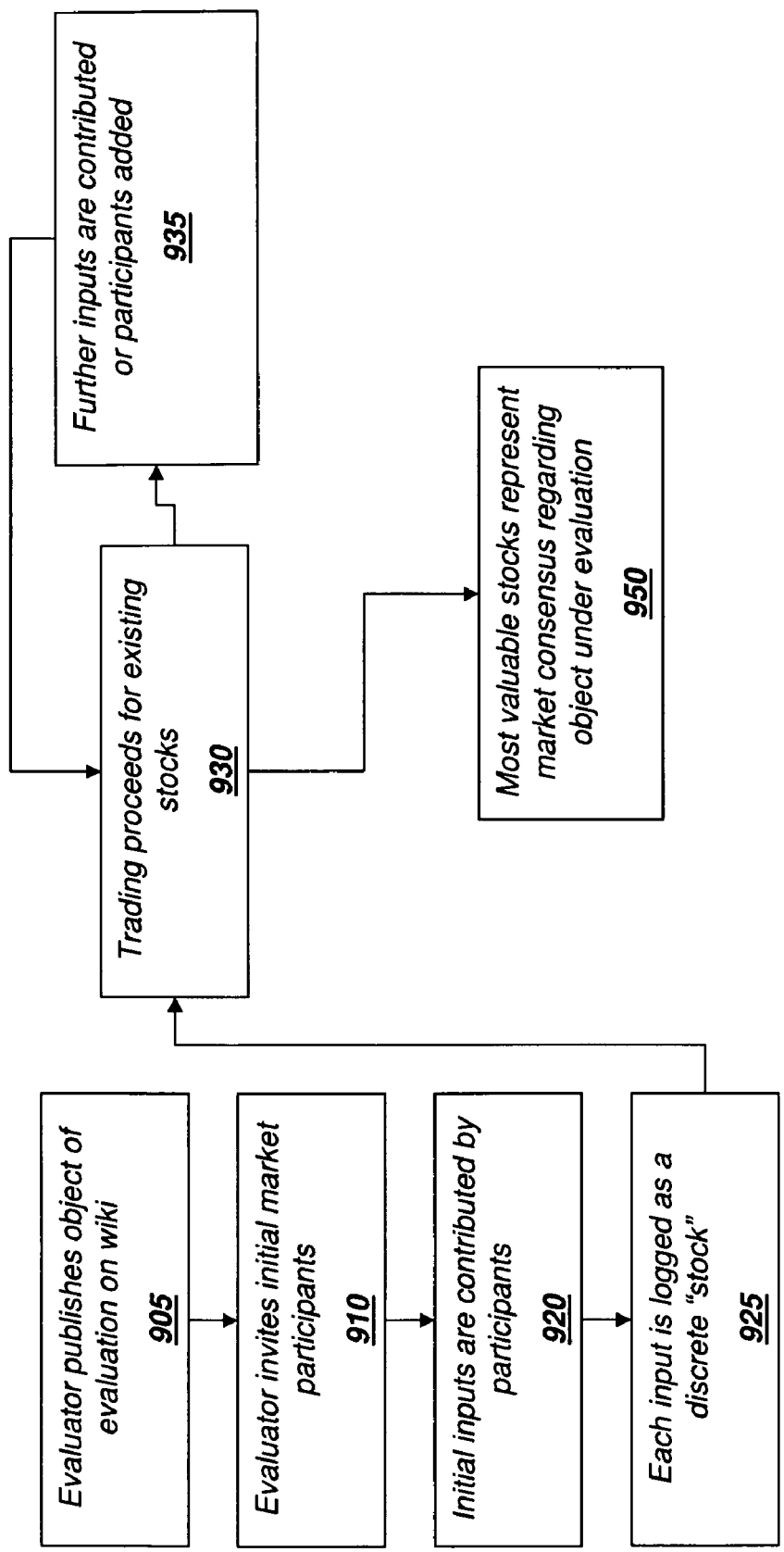
FIG. 9. depicts a flowchart of an alternative exemplary method used in embodiments of the present invention incorporating a wiki and a predictive market.

An alternative embodiment is shown in FIG. 9. In the alternative embodiment, the initial phase including steps 905, 910, 920, 925, and 930 proceed in the same way as the respective steps in FIG. 8. However, at step 935, further participants are allowed into the market, or further inputs are allowed onto the wiki, or both. If further participants are allowed into the market, they may be given the same or different starting conditions than the previous participant pool. For example, they might be given a smaller pool of capital to work with than the initial participants started with. If further inputs are added to the wiki, trading may be allowed on these additional inputs. Such inputs may represent either entirely new inputs, or may be refinements of existing inputs. Trading then continues at step 930. Step 935 may be repeated until trading is stopped, at which point the inputs are evaluated at step 950 in a similar fashion to step 850.

Figure 10:
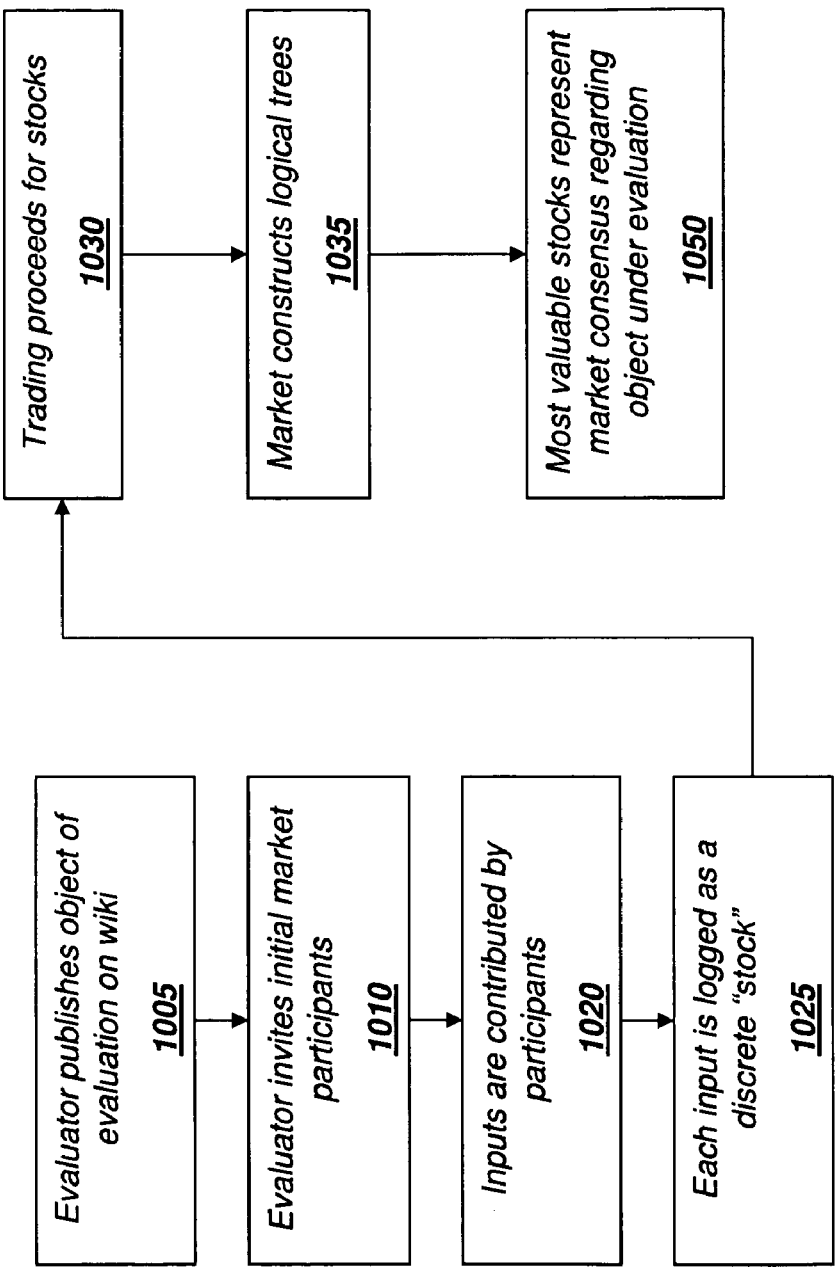
FIG. 10. depicts a flowchart of an alternative exemplary method used in embodiments of the present invention incorporating a wiki and a predictive market.

In another embodiment depicted in FIG. 10, the initial phase including steps 1005, 1010, 1020, 1025, and 1030 proceed in the same way as the respective steps in FIG. 8. At step 1035, the market may construct a collection of logical "trees" of the inputs, as described in more detail in relation to FIG. 13. The logical trees may be populated with a hierarchy of stocks, each of which represents a refinement or application of the proposition under evaluation. A "refinement" stock has the potential to gain higher value than its "parent", and thus may necessitate divestment of the parent in order to accrue the capital necessary to bid up the refinement. At the end of trading, the inputs are evaluated at step 1050 in a similar fashion to step 850.

Following is an example of the methods described above.

Example

Statistical Optimization of CAPM

Researchers at University X have developed an algorithm to improve upon the flaws in risk measurement produced by the Capital Asset Pricing Model (CAPM). The algorithm renders obsolete all documented attempts to rationalize CAPM's flaws against actual market behavior. By applying stochastic dominance analysis to historical daily close data on large baskets of stocks, the algorithm optimizes portfolio construction against a user-defined set of constraints—including risk profile, downside mitigation, tax consequences, hedge against concentrated positions, fees and turnover. University X holds the patent to the portfolio construction algorithm. It seeks to monetize this asset.

University X publishes the "Capital Asset Pricing Algorithm" case on the application. As shown in FIG. 11, the publication may be done through a wiki 1100, and may contain a short description of the algorithm 1120, notes from the research team, and initial thoughts on how the software might be used (in this case, to construct portfolios). University X then publishes an announcement of the new software application entry to early market participants—academics in the discipline, financial institutions, fund managers, investment clubs, mathematicians, business media and software developers, or whomever University X may designate. The devices employed for identification and announcement are many and varied, and may include distributed networks and viral pass-along for efficacy.

Interested participants register on the software application, agree to legal terms, gain an anonymous unique identity on the platform, and are assigned a uniform proxy capital base upon which to trade. As shown in FIG. 11, the software application entry for the "Capital Asset Pricing Algorithm" 1110 is accompanied by a public discussion board 1130, for questions and comments among the participants.

Several initial inputs 1140 (subsidiary to the published IP abstract) are contributed by registered participants to the software application engine. For example, they might be:

"This is a fast optimization only; it needs a bolt-on alpha strategy to work."

"Market neutral is the best strategy for this kind of protocol."

"This software should have a corporate events manager within its logic."

"This isn't a financial product at all. It's better for pure data mining."

The comments need not be correct or true. The market will evaluate the inputs and assign a value or utility to them. Inputs may be retained in the market and traded according to the market's perception of real value. Further, relative value may be measured precisely based on probabilistic context.

Figure 12:
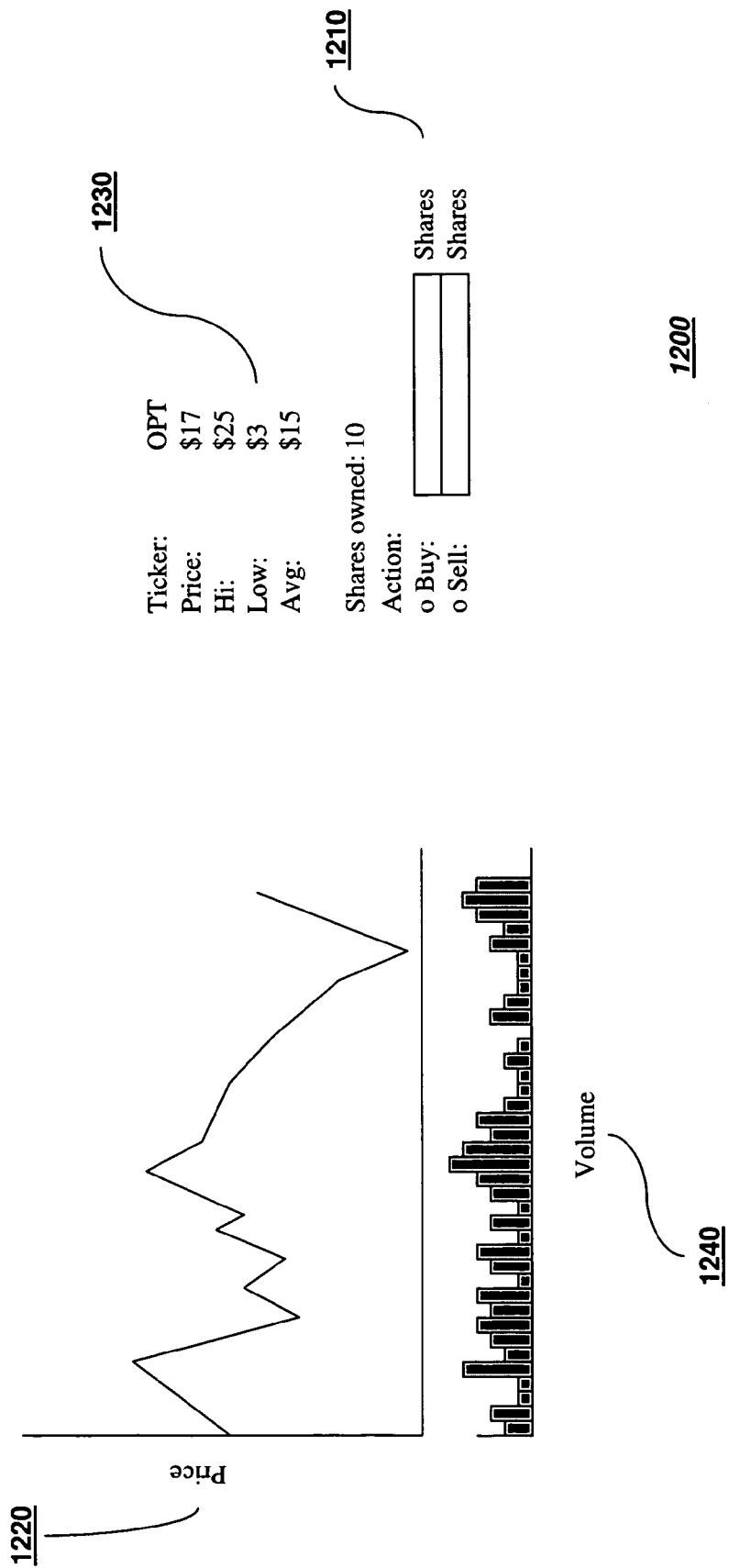
FIG. 12. depicts an exemplary screenshot of a trading window in a predictive market.

Each input is logged as a discrete stock in the predictive market, and trading is initiated for that issue. As shown in FIGS. 11-12, there may be a link, such as a hyperlink, between the inputs 1130 and the trading page 1200 for the predictive market. Market participants carry the ability to buy and sell 1210 at contracted prices defined by the market, and enjoy access to price histories 1220, low/high/avg information 1230, volume 1240, and other metrics. As some stocks are bid up, others may be decreased in value, or not traded at all. The market begins to assign predictive value to the propositions it deems most relevant to the raw IP case as initially described by the title 1110 and the description 1120.

As trading progresses, further inputs may be contributed—either as standalone propositions without prior precedent in the market, or as refinements of existing propositions. Standalones may be treated exactly as the initial inputs; they are traded or not traded as the market chooses. Refinements may be assigned to existing stocks, and traded as contingent issues. Refinements may be assigned to an existing stock by the contributor, by another participant, or by a moderator, for example. Alternatively, the refinements may be traded as discrete stocks.

Examples of further inputs might include:

"The best alpha bolt-on is X; it uses similar logic, but doesn't carry optimization capability."

"Market neutral will be attractive if the Sharpe ratio is within X/Y bounds, and if volatility conforms to Z. If this isn't possible, the algorithm should be pointed at an equity long/short strategy."

"This algorithm can be enhanced by automating the readjustment frequency according to X logic."

"The best application re: data mining is in exogenous event analysis."

"Leverage must be constrained below 3:1 for the following reasons . . . ."

"This must not be marketed as a hedge fund. Another term 'X' applies more accurately, and is preferable in this climate."

These examples are presented as brief narratives; in practice, each input may be codified more succinctly, with a narrative abstract of the input available in parallel.

Figure 13:
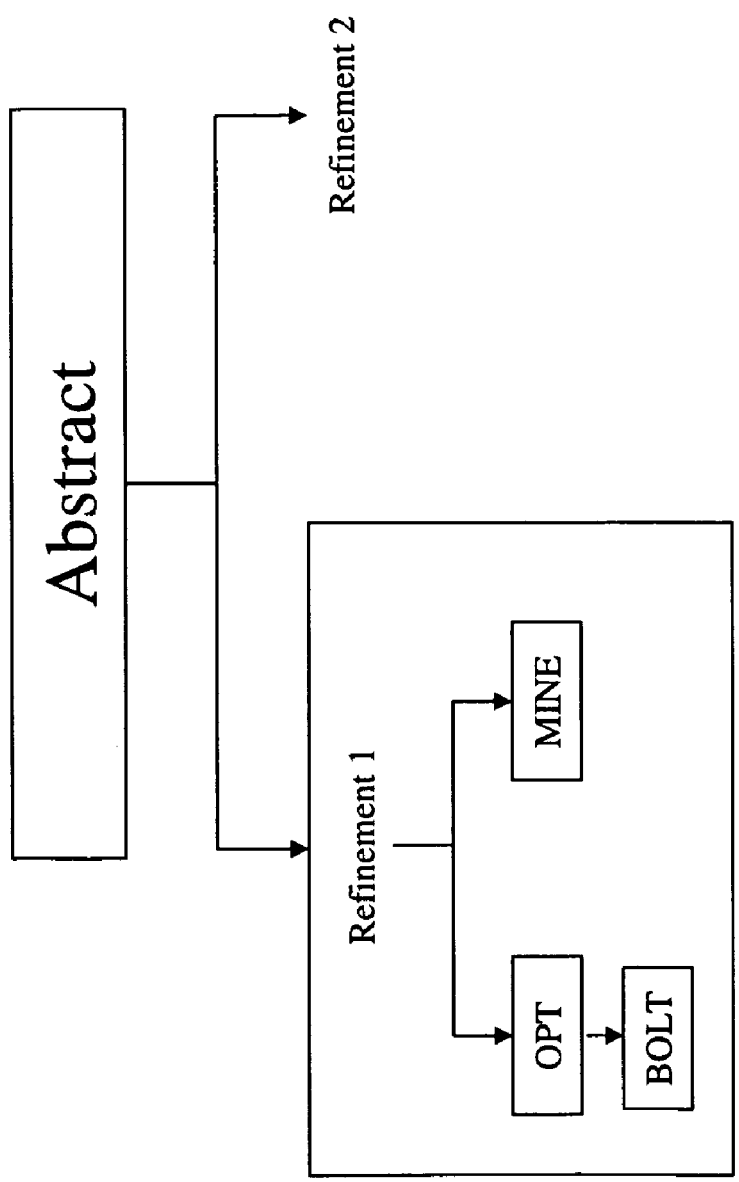
FIG. 13. depicts an exemplary logical tree for evaluating the proposition under analysis.

Based on these inputs, the market, or the participants in the market, or the stakeholder, or an outside user, may develop a set of logical trees, such as the logical tree depicted in FIG. 13. In the logical tree of FIG. 13, two related refinements to University's X have been identified. Refinement 1 includes the stocks OPT and MINE, as well as a further refinement of OPT, BOLT.

As trading proceeds, the most valuable stocks represent the predictive market's optimal expression of the IP on multiple subject layers, and the probability that such layers are more tractable in the marketplace than their peers.

Because of the anonymous nature of market participants, expert-driven skewing has been minimized, although participants with relatively high expertise in a proposition may have advantaged their positions by participating early and aggressively to amass holdings in certain propositions.

The above described procedures may be implemented as a software application in an electronic device, such as electronic device 400 depicted in FIG. 4. The methods described herein may also be implemented in a specially designed hardware device. In one embodiment, the described methods may be implemented as instructions stored on a computer readable medium, such as storage 410. The instructions may be executed by a processor 450 to cause the processor to carry out the steps of the method. When input is required, a participant may enter the input, for example using input device 430. When output is required, the output may be displayed to a participant, for example on display device 420. The electronic device may be implemented as a single unit, or the functionality depicted in FIG. 4 may be split among a number of units.

For example, display device 420 may be a screen integrated with the rest of electronic device 400, or may be a monitor, separate from other elements of the electronic device 400. In another example, the processor 450 and the storage 410 need not be located in a single unit. In this case, the storage 410 might be a removable hard drive, a CD-ROM, or a storage medium located on a remote server.

In another embodiment, elements of the described method may be performed remotely from a participant, for example on a server, such as electronic device 510. In one example of such an embodiment, a wiki 522 or predictive market 524 may be generated, managed, or stored on the electronic device 510. Participants 550, 551, 552 may interact with the components provided by the electronic device 510 through a network 500. Participants 550, 551, 552 may be using an electronic device such as electronic device 400 to interact with the network 500, for example through a network interface 440. The electronic device 510 may communicate with the network 500 using a network interface 540, which may allow the electronic device to send or receive information through the network 500.

The software application market produces a refined and qualified blueprint of the stakeholder's core proposition. When deemed appropriate during the market cycle, the stakeholder may perform tasks to further inform participants about an asset's profile—or, as in the case outlined above, may recognize enough market activity around the asset to justify backtesting and business model work-up.

In summary, the application (described in the above examples as the integration of wiki input and predictive markets) improves a decision-making or valuation process. The application may accept a raw proposition and enrich, augment, qualify, vet, and predictively model the raw proposition using a varied field of participants.

The present invention is not limited to the particular embodiments described herein. Those skilled in the art will recognize, or be able to ascertain using no more than routine experimentation, many equivalents to the specific embodiments of the invention described herein. Such equivalents are intended to be encompassed by the following claims.

The invention claimed is:

1. A method implemented in one or more electronic devices for evaluating a proposition under analysis, the method comprising:
   identifying, by a process executed by at least one processor, participants for evaluating the proposition under analysis;
   receiving at the one or more electronic devices a plurality of initial inputs related to the proposition under analysis, each of the plurality of initial inputs relating to an evaluation or an improvement of the proposition under analysis;
   logging, by a process executed by at least one processor, each of the plurality of initial inputs as a tradable input in a market using the one or more electronic devices;
   obtaining, by a process executed by at least one processor, at least one bid on at least one of the tradable inputs from at least one of the participants using the one or more electronic devices;
   assigning, by a process executed by at least one processor, at least one utility value to at least one of the inputs based on the bid obtained for the at least one of the tradable inputs with the one or more electronic devices;
   determining, by a process executed by at least one processor, and based on the at least one utility value, a consensus regarding the proposition under analysis using the one or more electronic devices; and
   storing the consensus in a memory of the one or more electronic devices.

2. The method of claim 1, wherein the plurality of initial inputs are solicited from the participants.

3. The method of claim 1, further comprising
   soliciting further inputs after logging the initial inputs; and
   assigning a utility value to each of the further inputs.

4. The method of claim 1, wherein the plurality of initial inputs are established through an Internet wiki.

5. The method of claim 1, further comprising logging the plurality of initial inputs as stocks in a predictive market.

6. The method of claim 1, wherein the at least one bid is obtained through the predictive market.

7. The method of claim 1, wherein the proposition under analysis is an intellectual property asset.

8. The method of claim 7, wherein the consensus relates to a value of the intellectual property asset.

9. The method of claim 1, wherein the proposition under analysis is related to a field and the participants comprise experts in the field.

10. The method of claim 9, wherein the participants further comprise non-experts in the field.

11. A system for use in evaluating a proposition under analysis based on input from participants, comprising:
    at least one processor for executing instructions, said instructions causing the at least one processor to
       establish a plurality of initial inputs related to the proposition under analysis, each of the plurality of initial inputs relating to an evaluation or an improvement of the proposition under analysis,
       log each of the plurality of initial inputs as a tradable input in a market,
       obtain at least one bid on at least one of the initial inputs from at least one of the participants,
       calculate at least one utility value to at least one of the inputs based on the bid obtained for the at least one of the inputs,
       determine, based on the at least one utility value, a consensus regarding the proposition under analysis;
    a memory for storing the consensus;
    at least one input device for accepting at least one input from the at least one of one of the participants; and
    at least one display device for displaying information related to the proposition under analysis.

12. The system of claim 11, wherein the instructions further cause the at least one processor to establish the plurality of initial inputs based on input from the participants.

13. The system of claim 11, wherein the instructions further cause the at least one processor to:
    establish further inputs after logging the initial inputs; and
    calculate a utility value to each of the further inputs.

14. The system of claim 11, wherein the instructions further cause the at least one processor to establish and maintain an Internet wiki, and the plurality of initial inputs are established through the Internet wiki.

15. The system of claim 11, wherein the instructions further cause the at least one processor to establish and maintain a predictive market, and the plurality of initial inputs are logged as stocks in the predictive market.

16. The system of claim 15, wherein the at least one processor obtains the at least one bid through the predictive market.

17. The system of claim 11, wherein the proposition under analysis is an intellectual property asset.

18. The system of claim 17, wherein the consensus relates to a value of the intellectual property asset.

19. The system of claim 11, wherein the proposition under analysis is related to a field and the participants comprise experts in the field.

20. The system of claim 19, wherein the participants further comprise non-experts in the field.

21. A non-transitory electronic device readable medium holding electronic device executable instructions that, when executed by at least one processor, cause the at least one processor to:
- establish a plurality of initial inputs related to the proposition under analysis, each of the plurality of initial inputs relating to an evaluation or an improvement of the proposition under analysis;
- log each of the plurality of initial inputs as a tradable input in a market;
- obtain at least one bid on at least one of the initial inputs from at least one of the participants;
- calculate at least one utility value to at least one of the inputs based on the bid obtained for the at least one of the inputs;
- determine, based on the at least one utility value, a consensus regarding the proposition under analysis; and
- store the consensus in a memory.

22. The electronic device readable medium of claim 21, wherein the instructions further cause the at least one processor to establish the plurality of initial inputs based on input from the participants.

23. The electronic device readable medium of claim 21, wherein the instructions further cause the at least one processor to:
- establish further inputs after logging the initial inputs; and
- calculate a utility value to each of the further inputs.

24. The electronic device readable medium of claim 21, wherein the instructions further cause the at least one processor to establish and maintain an Internet wiki, and the plurality of initial inputs are established through the Internet wiki.

25. The electronic device readable medium of claim 21, wherein the instructions further cause the at least one processor to establish and maintain a predictive market, and the plurality of initial inputs are logged as stocks in the predictive market.

26. The electronic device readable medium of claim 25, wherein the at least one processor obtains the at least one bid through the predictive market.

27. The electronic device readable medium of claim 21, wherein the proposition under analysis is an intellectual property asset.

28. The electronic device readable medium of claim 27, wherein the consensus relates to a value of the intellectual property asset.

29. The electronic device readable medium of claim 21, wherein the proposition under analysis is related to a field and the participants comprise experts in the field.

30. The electronic device readable medium of claim 29, wherein the participants further comprise non-experts in the field.

* * * * *